US012726112B2

(12) United States Patent
Jiang Häfner et al.

(10) Patent No.: US 12,726,112 B2
(45) Date of Patent: Sep. 1, 2026

(54) METHOD FOR ENERGIZING A MODULAR MULTILEVEL CONVERTER

(71) Applicant: Hitachi Energy Ltd, Zürich (CH)

(72) Inventors: Ying Jiang Häfner, Ludvika (SE); Jimmy Öhman, Ludvika (SE); Andreas Vinnberg, Orsa (SE)

(73) Assignee: HITACHI ENERGY LTD, Zürich (CH)

( * ) Notice: Subject to any disclaimer, the term of this patent is extended or adjusted under 35 U.S.C. 154(b) by 0 days.

(21) Appl. No.: 19/132,707

(22) PCT Filed: Dec. 7, 2023

(86) PCT No.: PCT/EP2023/084774
§ 371 (c)(1),
(2) Date: May 23, 2025

(87) PCT Pub. No.: WO2024/121334
PCT Pub. Date: Jun. 13, 2024

(65) Prior Publication Data

US 2026/0005600 A1 Jan. 1, 2026

(30) Foreign Application Priority Data

Dec. 8, 2022 (EP) .................................... 22212176

(51) Int. Cl.
*H02M 7/483* (2007.01)
*H02M 1/00* (2006.01)
(Continued)

(52) U.S. Cl.
CPC ........... *H02M 1/36* (2013.01); *H02M 1/0067* (2021.05); *H02M 7/219* (2013.01); *H02M 7/4835* (2021.05); *H02M 7/483* (2013.01)

(58) Field of Classification Search
CPC ............. H02M 1/0003; H02M 1/0009; H02M 1/0054; H02M 1/0067; H02M 1/0077;
(Continued)

(56) References Cited

U.S. PATENT DOCUMENTS 10,523,131 B2 12/2019 Li et al.
11,349,384 B2 5/2022 Barupati et al.
(Continued)

FOREIGN PATENT DOCUMENTS

CN 101795057 A 8/2010
CN 102739030 A 10/2012
(Continued)

OTHER PUBLICATIONS

IPEA/EPO, International Preliminary Report on Patentability, issued in PCT/EP2023/084774, mailed Feb. 21, 2025, 13 pages.
(Continued)

*Primary Examiner* — Thienvu V Tran
*Assistant Examiner* — Shahzeb K Ahmad
(74) *Attorney, Agent, or Firm* — PROCOPIO, CORY, HARGREAVES & SAVITCH LLP

(57) ABSTRACT

The present disclosure relates to a method for energizing a modular multilevel converter comprising converter valves that each have interconnected cells. Each cell comprises power electronic switches in a full-bridge arrangement, a chargeable element, and gate drive units, one gate drive unit for each power electronic switch. The method includes: providing power to the modular multilevel converter from an external power supply; powering the cells, thereby charging the chargeable elements; generating, when a cell voltage caused by said charging exceeds a first threshold voltage level, a cell sub-ready signal for that cell; generating, when at least a predetermined minimum number of cells have generated the sub-ready signal, a subready_for_operation
(Continued)

signal; and running a deblocking sequence that electrically configures the cells to be continuously charged as half-bridge cells, and keep the first power electronic switch closed until the cell voltage has reached a converter operable voltage.

6 Claims, 3 Drawing Sheets

(51) Int. Cl.
*H02M 1/36* (2007.01)
*H02M 7/219* (2006.01)

(58) Field of Classification Search
CPC ............ H02M 1/12; H02M 1/32; H02M 1/36; H02M 1/38; H02M 7/21; H02M 7/217; H02M 7/219; H02M 7/48; H02M 7/483; H02M 7/4835; H02M 7/49; H02M 7/66; H02M 7/757
See application file for complete search history.

(56) References Cited

U.S. PATENT DOCUMENTS

2016/0028303 A1* 1/2016 Chataignere ........ H02M 7/4835 320/107
2016/0294276 A1* 10/2016 Onishi .................... H02M 1/36
2016/0301308 A1* 10/2016 Amar ................... H03K 17/168
2018/0131291 A1* 5/2018 Lavieville ............. H02M 7/483
2018/0191238 A1* 7/2018 Tsuchiya ................. H02M 1/32
2018/0302003 A1* 10/2018 Mori ....................... H02M 7/17
2020/0076321 A1 3/2020 Ding et al.
2020/0350767 A1* 11/2020 Barupati ............... H02M 7/483

FOREIGN PATENT DOCUMENTS

CN 103595237 A 2/2014
CN 104137404 A 11/2014
JP 6203289 B2 9/2017
JP 2020515212 A 5/2020
WO 2018188350 A1 10/2018
WO 2019161907 A1 8/2019
WO 2019205368 A1 10/2019
WO 2020258512 A1 12/2020

OTHER PUBLICATIONS

Huang et al., "Study and Implementation on Start-Up Control of Full-Bridge LLC Resonant Converter", 2018 IEEE Transportation Electrification Conference and Expo, Asia-Pacific (ITEC Asia-Pacific), 6 pages.

* cited by examiner

METHOD FOR ENERGIZING A MODULAR MULTILEVEL CONVERTER

CROSS-REFERENCE TO RELATED APPLICATIONS

The present application is a national stage entry of International Patent Application No. PCT/EP2023/084774, filed on Dec. 7, 2023, which claims priority to European Patent Application No. 22212176.6, filed on Dec. 8, 2022, which are both hereby incorporated herein by reference as if set forth in full.

TECHNICAL FIELD

The present disclosure generally relates to modular multilevel converters. In particular, the present disclosure relates to energizing such a modular multilevel converter before it starts operating.

BACKGROUND

A modular multilevel converter (MMC) typically includes converter valves having several interconnected cells each. Each cell includes several various semiconductor devices, such as e.g. IGBT switches and/or other switching devices, a cell capacitor and diodes, along with control devices, such as e.g. control boards for controlling the cell and communicating with central control units, gate drive units (GDUs) controlling the switches, etc. To power the control devices, energy is usually taken from the cell capacitors. As a result, the cell capacitors must be charged to a sufficient charging level before the electronic control equipment may assume control of the semiconductor devices and of the MMC, and before the MMC may start operating as intended when connected to an electric grid.

The control boards will function properly only if those boards have sufficient power supply. The power supply is realized via, for instance, a particular functional board or a DC-DC converter which converts the high cell voltage, which may be in the range of several kilovolts, to low voltage, which may be in the range of tenth of volts to hundreds of volts.

For a cost-effective manufacture, normally a cell design may be not changed in different applications. However, in different converter configurations or applications, there may be different initial cell voltages. This poses challenges in designing power supply. For a given power supply design, the initial cell voltage may be sufficiently high to allow power supply functioning properly for some converter configurations, but it may be not sufficiently high for other converter configurations which makes it not possible to start the operation of the MMC.

The energizing of the cell capacitors may be implemented by providing power from a power supply such as e.g. the electric grid, to which the MMC is, or is to be, connected, itself or from an auxiliary power supply, such as a generator, in cases where the electric grid is not readily available for the charging.

During the initial charging of the cell capacitors, the MMC is normally operated in a blocking mode, wherein all switches in the converter cells are open such that current may only pass through the accompanying freewheeling diodes to the cell capacitors. When the cell voltage of a cell reaches a first level, the local control boards of the cell may start the very basic functions such as monitoring cell status and cell voltage. When the cell voltage reaches a second level, the gate drive units may have sufficiently high power to allow proper switching control functions. Only after the cell voltage is higher than the second level, the cell is confirmed to be ready for operation, and a signal of cell OK may be sent to a central valve control unit (VCU). When there are more than a defined minimum number of cells which have indicated cell OK in the VCU, a "ready for operation" (RFO) may be indicated to a control and protection system. Thereafter, the MMC is allowed to be deblocked and start to operate.

However, for reasons mentioned above, sometimes it is not possible to properly energize the MMC up to the second level, and consequently the MMC will not be deblocked and start to operate.

SUMMARY

The present disclosure seeks to at least partly remedy the above discussed issues. To achieve this, a method of energizing a modular multi-level converter and a modular multilevel converter, as defined by the independent claims are provided. Further embodiments are provided in the dependent claims.

According to an aspect of the present disclosure, there is provided a method for energizing a modular multilevel converter comprising converter valves, each converter valve having a plurality of interconnected cells, wherein each cell comprises a plurality of power electronic switches in a full-bridge arrangement, a chargeable element, and a plurality of gate drive units, one gate drive unit for each power electronic switch, the method comprising:

- provide power to the modular multilevel converter from an external power supply;
- powering the cells, thereby charging the chargeable elements of the cells;
- generating, when a cell voltage caused by said charging exceeds a first threshold voltage level, a cell sub-ready signal for that cell;
- generating, when at least a predetermined minimum number of cells have generated the sub-ready signal, a sub-ready_for_operation signal; and
- running a deblocking sequence comprising closing a first power electronic switch in all cells to electrically configure the cells to be continuously charged as a half-bridge cells and keep the first power electronic switch closed until the cell voltage has reached a converter operable voltage, which is higher than a second threshold voltage.

By this way of the energizing the MMC the dependency of the converter configuration is significantly reduced.

According to an embodiment of the method the powering of the cells may comprise powering only a first gate drive unit of said plurality of gate drive units of each cell.

According to an embodiment of the method said generating a cell sub-ready signal may be followed by sending the cell sub-ready signal to a valve control unit controlling the valves, which valve control unit is included in the modular multilevel converter.

According to another aspect of the present disclosure, there is provided a modular multilevel converter comprising converter valves, each converter valve having a plurality of interconnected cells, wherein each cell comprises a plurality of power electronic switches in a full-bridge arrangement, a chargeable element, and a plurality of gate drive units, one gate drive unit for each power electronic switch. The MMC is configured to, at an initial power up, receive power from an external power supply and power the cells, thereby charging the chargeable elements of the cells. Each cell is configured to, when a cell voltage caused by said charging exceeds a first threshold voltage level, generate a cell sub-ready signal. The MMC is configured to, when at least a predetermined minimum number of cells have generated the sub-ready signal, run a deblocking sequence comprising closing a first power electronic switch in all cells to electrically configure the cells to be continuously charged as a half-bridge cells, and keep the first power electronic switch closed until the cell voltage has reached a converter operable voltage, which is higher than a second threshold voltage.

According to an embodiment of the MMC it may comprise a valve control unit, which is configured to control the converter valves and to receive the sub-ready signals from the cells.

According to an embodiment of the MMC each cell may comprise control logic configured to, at the beginning of the initial power up merely provide power to a first gate drive unit of said plurality of gate drive units of each cell.

BRIEF DESCRIPTION OF THE DRAWINGS

Exemplifying embodiments of the present disclosure will be described below with reference to the accompanying drawings, in which.

DETAILED DESCRIPTION

Figure 1:
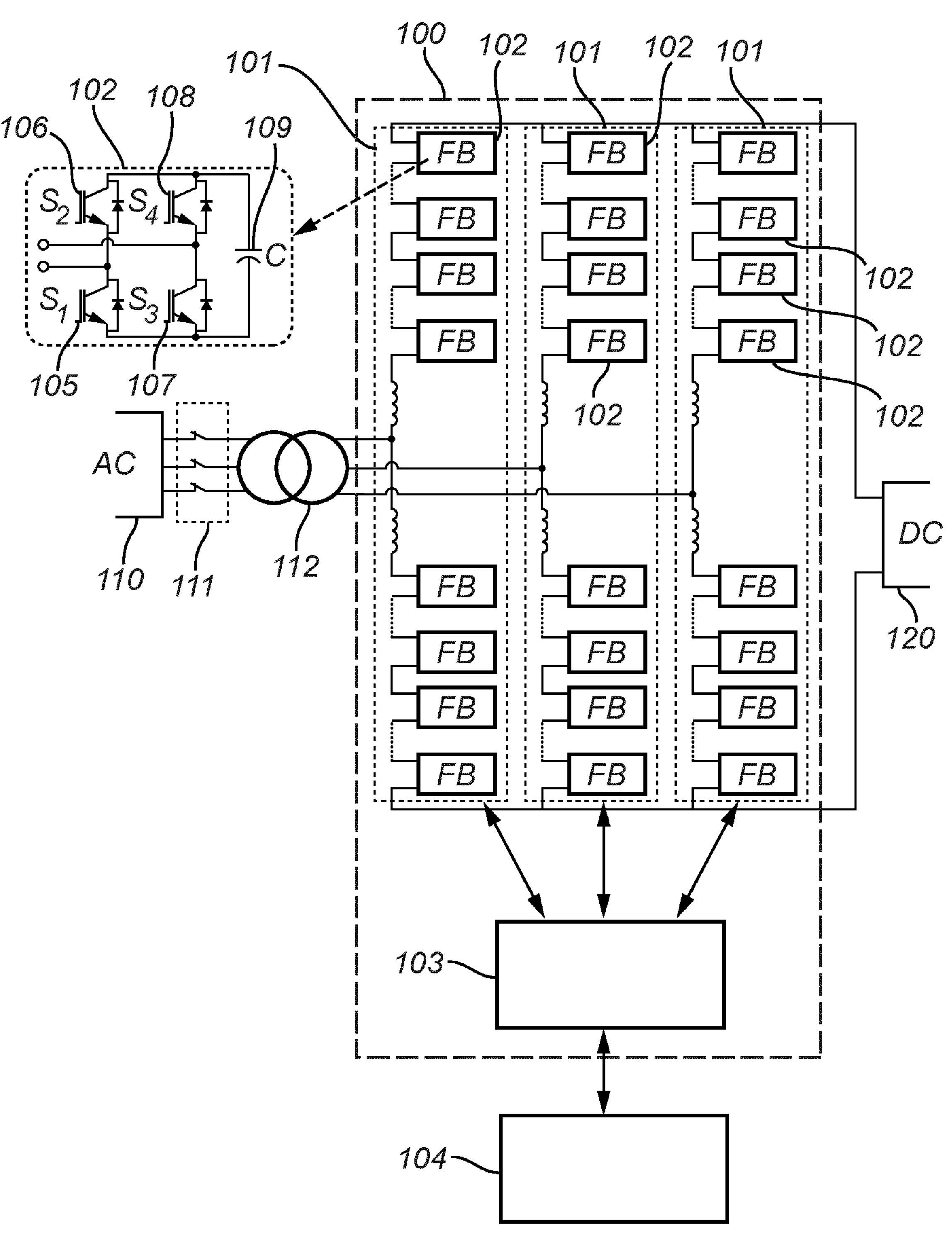
FIG. 1 is a block diagram of an embodiment of a modular multilevel converter according to the present disclosure.

The present disclosure will be described hereinafter with reference to the accompanying drawings, in which exemplifying embodiments are shown. The present disclosure should however not be construed as limited to the embodiments set forth herein; rather, these embodiments are provided by way of example so that this description will convey the scope of the present disclosure to those skilled in the art.

An exemplifying embodiment of the present modular multi-level converter (MMC) 100 comprises converter valves 101, such as three converter valves 101, one converter valve per phase. Each converter valve 101 has a plurality of interconnected cells 102, also called submodules. The MMC 100 is connectable, on one side thereof, to electrical phase lines of an AC power supply 110, such as an AC grid or some other feasible AC power supply, typically via an AC breaker 111 and a transformer 112 and, on the other side thereof, to a DC system 120, such as an HVDC system or any other feasible DC system. Each converter valve 101 comprises two valve arms connected between an AC phase terminal and first and second DC terminals, respectively, such as a positive pole and a negative pole of the DC system 120. The MMC 100 further comprises a valve control unit (VCU) 103 connected to the converter valves 101. The VCU 103, in turn, may be connected to a higher-level control device 104 external of the MMC 100. The higher-level control device 104 may be responsible for controlling the overall operation of the MMC 100, as well as further MMCs.

Each cell 102 comprises a plurality of power electronic switches 105, 106, 107, 108, and a chargeable element 109, such as a cell capacitor. Further, each power electronic switch 105-108 is provided with a freewheeling diode 113-116. Further, the cell 102 comprises control circuitry 117 including control boards for controlling the cell and communicating with central control units, and gate drive units (GDUs), one GDU for each power electronic switch 105-108, controlling the switching thereof. In case of IGTB switches, the GDUs can be considered to turn the power electronic switches on and off, corresponding to closing and opening the switches, respectively.

Figure 2:
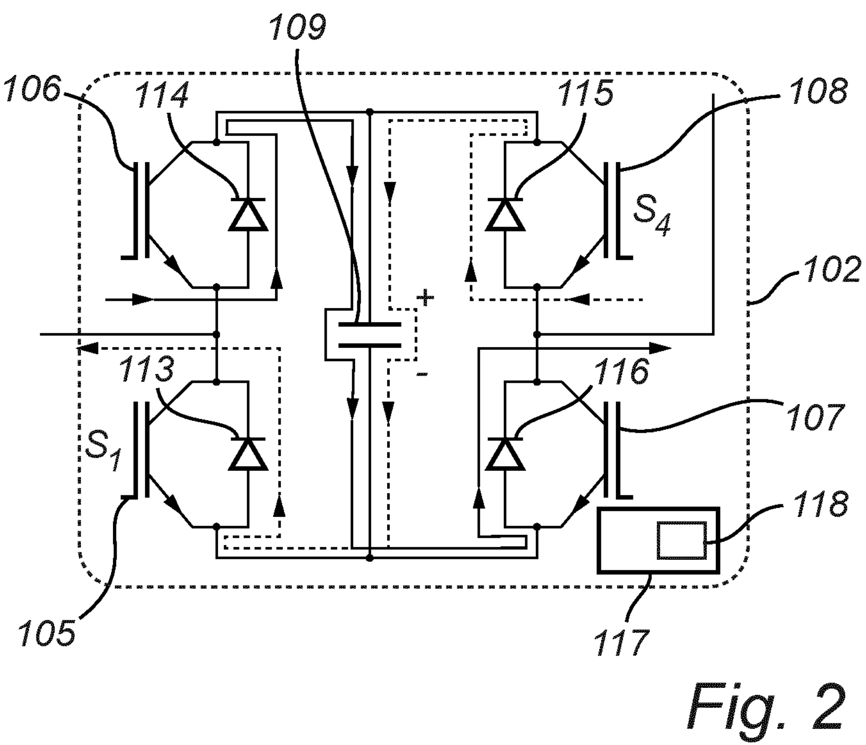
FIGS. 2 and 3 are schematic circuit diagrams of a cell of the modular multilevel converter indicating different current flow paths.
Figure 3:
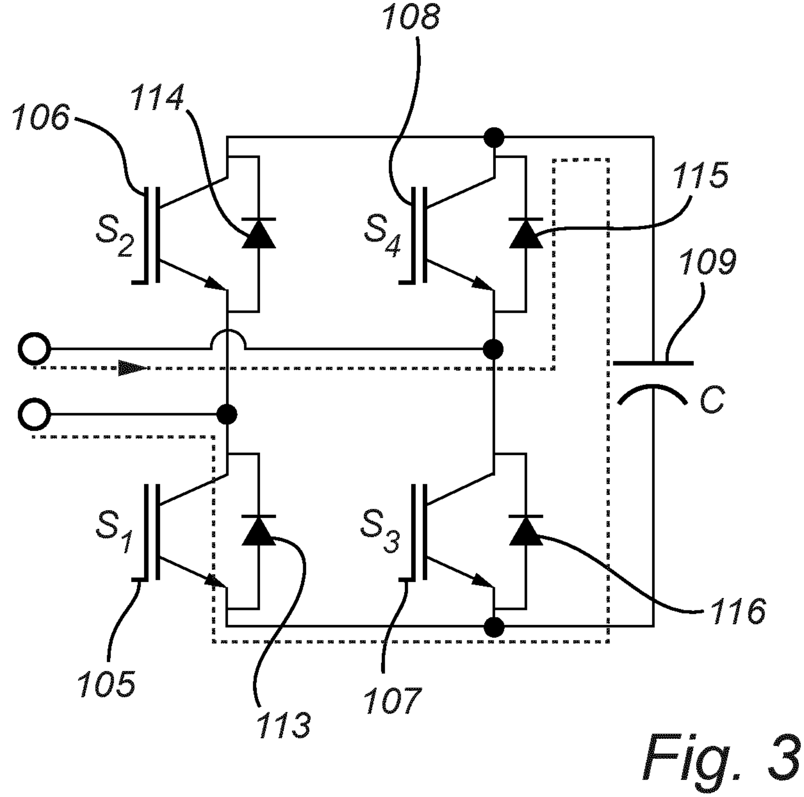

FIG. 2 shows a cell with the power electronic switches 105-108 at the other side of the converter capacitor 109 than in FIG. 1 and FIG. 3. This is optional, and is merely for purposes of clarity, in order to show current paths through the cell, while the cell circuitry has the same structure in all figures.

The cells 102 are full-bridge (FB) cells, i.e. the plurality of power electronic switches 105-108 is provided as an FB arrangement, and the power electronic switches 105-108 in conjunction with their respective freewheeling diode 113-116 are connected in an H-bridge configuration together with the cell capacitor 109.

Figure 4:
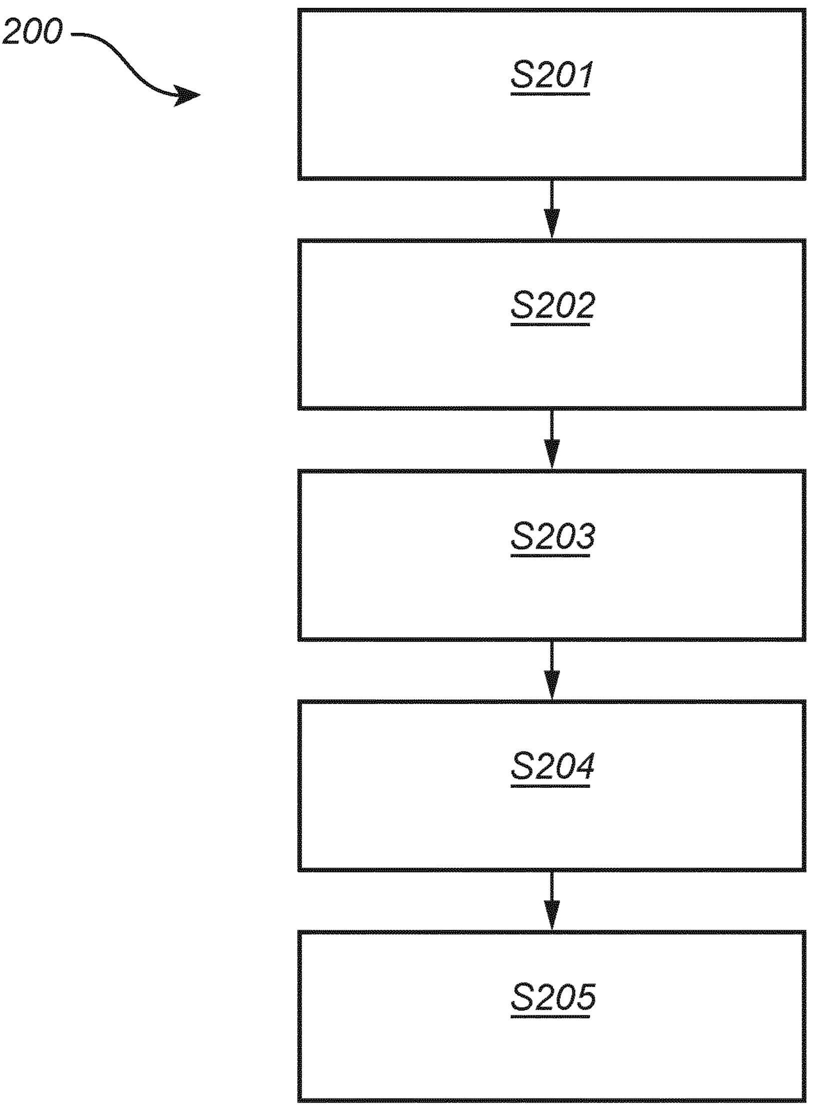
FIG. 4 is a flow chart of an embodiment of a method for energizing a modular multilevel converter according to the present disclosure.

According to an embodiment of the present method for energizing the MMC, denoted 200 in the flow chart of FIG. 4, the MMC 100 is initially provided with power from the AC power supply 110, S201, by closing the AC breaker 111. Thereby, the cells 102 are powered, S202, and the cell capacitors 109 start charging by being provided with current through the freewheeling diodes 113-116. The current paths within the cell 102 are shown in FIG. 2, with a full line for one polarity of the supply current and with a broken line for the other polarity of the supply current. When the cell voltage in a cell 102 increases and exceeds a first threshold level, then a cell sub-ready signal is generated for that cell 102 is generated, S203, by means of the control circuitry 117. More particularly, in order for the cell sub-ready signal to be generated the cell voltage has to reach a level where the cell 102 is ready for switching of a first power electronic switch 105, also denoted S1 in the figures. The cell sub-ready signal is sent to the VCU 103. Comparing with the prior art method, where the first voltage level renders the control logic, residing in the control circuitry 117, start up some basic functions such as monitoring and the like, the first threshold level is a higher voltage. On the other hand, the first threshold level is lower than the second level of the prior art mentioned above.

When there are more than a predefined minimum number of cells which have sent the cell sub-ready signal to the VCU 103, a sub-ready_for_operation signal is generated by the VCU 103, S204, and sent to the higher-level circuitry 104. Thereafter, the MMC 100 is allowed to be deblocked, and a deblocking sequence is initiated, S205. The deblocking sequency begins with switching the first power electronic switch 105 in every cell 102 to a closed position, i.e. turning it on. When merely the first power electronic switch 105 is closed the cell 102 will function as a half-bridge cell, and the charging current will flow through the freewheeling diode 115 of a second power electronic switch 108 of the cell 102, also denoted S4, as shown with the broken line in FIG. 3. There will be no discharge current in the cell capacitor 109 and it will be charged by a one direction current. All cells 102 will now be charged with the same current, and the total valve arm voltage may reach as high as twice the peak AC supply voltage. This will secure a cell voltage that is higher than the above-mentioned second voltage level in the prior art method, and high enough to allow a proper function of the MMC 100 for all converter configurations. This charging in half-bridge configuration will continue until the cell voltage has reached a converter operable voltage, which is higher than a second threshold voltage, and high enough to secure a proper functioning of the MMC 100. Then the first power electronic switch 105 is turned off. The MMC 100 is now ready to be set in operation mode, or in other words ready to start to operate. Thus, the MMC 100 is finally deblocked in full and thereby the deblocking sequence has been completed.

According to an embodiment of the present disclosure, the control circuitry 117 may comprise control logic configured to, at the beginning of the initial power up provide power to merely a first GDU of said plurality of GDUs 118 of each cell 102, i.e. the GDU for the first power electronic switch 105. Powering of the GDUs 118 of all the other power electronic switches 106-108 is disconnected until the cell voltage reaches the second threshold voltage. Due to the reduction of the total amount of loads to be powered by the cell capacitor, the GDU for the first power electronic switch 105 may be ready for operation when the cell voltage reaches a third threshold voltage, which is higher than the first level of prior art but lower than second level of prior art. When the cell voltage exceeds the third threshold voltage the cell sub-ready signal for that cell 102 is generated, by means of the control circuitry 117. Thereafter follows the same operations as described for the embodiment above. It should be noted that by first merely activating a single power electronic switch it is possible to boost the charging of the cell capacitor such that it is ensured that the rest of the GDUs and switches will get enough power to be operable.

While the present disclosure has been illustrated and described in detail in the drawings and foregoing description, such illustration and description are to be considered illustrative or exemplary and not restrictive.

Although features and elements are described above in particular combinations, each feature or element can be used alone without the other features and elements or in various combinations with or without other features and elements.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain features are recited in mutually different dependent claims does not indicate that a combination of these features cannot be used to advantage. Any reference signs in the claims should not be construed as limiting the scope.

The invention claimed is:

1. A method for energizing a modular multilevel converter comprising converter valves, each converter valve having a plurality of interconnected cells, wherein each cell comprises a plurality of power electronic switches in a full-bridge arrangement, a chargeable element, and a plurality of gate drive units, one gate drive unit for each power electronic switch, the method comprising:

providing power to the modular multilevel converter from an external power supply;

powering the cells, thereby charging the chargeable elements of the cells;

generating, when a cell voltage caused by said charging exceeds a first threshold voltage level, a cell sub-ready signal for that cell;

generating, when at least a predetermined minimum number of cells have generated the sub-ready signal, a sub-ready for operational signal;

running a deblocking sequence comprising closing a first power electronic switch in all cells to electrically configure the cells to be continuously charged as a half-bridge cells, and keep the first power electronic switch closed until the cell voltage has reached a converter operable voltage, which is higher than a second threshold voltage, said powering the cells comprising initially powering only a first gate drive unit of said plurality of gate drive units of each cell, the first gate drive unit being connected with the first power electronic switch; and powering, when the second threshold voltage has been reached, the rest of the gate drive units in each cell.

2. The method of claim 1, said generating a cell sub-ready signal being followed by sending the cell sub-ready signal to a valve control unit controlling the valves, which valve control unit is included in the modular multilevel converter.

3. The method according to claim 2, said deblocking sequence comprising opening the first power electronic switch and setting the modular multilevel converter in an operation mode.

4. The method according to claim 1, said deblocking sequence comprising opening the first power electronic switch and setting the modular multilevel converter in an operation mode.

5. A modular multilevel converter comprising converter valves, each converter valve having a plurality of interconnected cells, wherein each cell comprises a plurality of power electronic switches in a full-bridge arrangement, a chargeable element, and a plurality of gate drive units, one gate drive unit for each power electronic switch, the modular multilevel converter being configured to, at an initial power up, receive power from an external power supply and power the cells, thereby charging the chargeable elements of the cells;

wherein each cell is configured to, when a cell voltage caused by said charging exceeds a first threshold voltage level, generate a cell sub-ready signal; and wherein the modular multilevel converter is configured to, when at least a predetermined minimum number of cells have generated the sub-ready signal, run a deblocking sequence comprising closing a first power electronic switch in all cells to electrically configure the cells to be continuously charged as a half-bridge cells, and keep the first power electronic switch closed until the cell voltage has reached a converter operable voltage, which is higher than a second threshold voltage, wherein each cell comprises control logic configured to, at the beginning of the initial power up, merely provide power to a first gate drive unit of said plurality of gate drive units of each cell, the first gate drive unit being connected with the first power electronic switch, and, when the second threshold voltage has been reached, provide power to the rest of the gate drive units in each cell.

6. The modular multilevel converter of claim 5, further comprising a valve control unit, which is configured to control the converter valves and to receive the sub-ready signals from the cells.

* * * * *